United States Patent [19]

von Bonin

[11] Patent Number: 5,094,780

[45] Date of Patent: Mar. 10, 1992

[54] INTUMESCENT MOULDINGS

[75] Inventor: Wulf von Bonin, Odenthal, Fed. Rep. of Germany

[73] Assignee: Bayer Aktiengesellschaft, Leverkusen, Fed. Rep. of Germany

[21] Appl. No.: 661,758

[22] Filed: Feb. 27, 1991

[30] Foreign Application Priority Data

Mar. 7, 1990 [DE] Fed. Rep. of Germany ....... 4007075

[51] Int. Cl.$^5$ .............................................. C09K 21/00
[52] U.S. Cl. .................................. 252/606; 428/408; 428/921; 423/448
[58] Field of Search ................ 252/606; 428/921, 408; 423/448

[56] References Cited

U.S. PATENT DOCUMENTS

| | | | |
|---|---|---|---|
| 3,885,007 | 5/1975 | Olsen et al. | 264/42 |
| 4,293,450 | 10/1981 | Vogel | 252/503 |
| 4,876,077 | 10/1989 | Murkami | 423/448 |
| 4,908,200 | 3/1990 | Fuji et al. | 423/448 |
| 4,915,984 | 4/1990 | Murkami | 427/113 |
| 4,945,015 | 7/1990 | Milner et al. | 523/179 |
| 4,992,481 | 2/1991 | von Bonin et al. | 521/54 |

FOREIGN PATENT DOCUMENTS

| | | |
|---|---|---|
| 0189674 | 8/1986 | European Pat. Off. . |
| 2430720 | 1/1976 | Fed. Rep. of Germany . |
| 83/02120 | 6/1983 | PCT Int'l Appl. . |

OTHER PUBLICATIONS

Journal of Materials Science, vol. 22, No. 12, 12/87, London, GB, pp. 4190-4198.

*Primary Examiner*—Richard D. Lovering
*Assistant Examiner*—N. Bhat
*Attorney, Agent, or Firm*—Sprung Horn Kramer & Woods

[57] ABSTRACT

Novel intumescent mouldings, which can be produced by heating expandable graphites in moulds to temperatures between 150° C. and 350° C. The mouldings can be used, for example, for purposes of preventive fire protection.

4 Claims, No Drawings

INTUMESCENT MOULDINGS

The present invention relates to intumescent mouldings, processes for producing them and their use in preventive fire protection or for producing special functional elements.

It is known that expandable graphite materials, due to their ability to intumesce, are used in preventive fire protection, because they expand at temperatures above about 150° C. and thus form a protection, which does not burn easily, and/or seal cavities through which fire gases would pass. Hitherto, unexpanded expandable graphites have been used for this purpose in a form bonded by polymers. In the unbonded state, expandable graphite cannot be compressed to give stable mouldings at temperatures below 150° C., even under high pressures (for example 50–100 bar).

A process for producing intumescent mouldings has now been found, which is characterized in that expandable graphites are heated in moulds to temperatures between 150° and 350° C. Even though expandable graphite materials foam up at 150°–250° C., it has been found, surprisingly, that in this way stable mouldings are obtained which, in spite of the pre-heating, still have intumescence properties which are surprisingly similar to those of unheated expandable graphite.

It is also possible to heat mixtures of expandable graphites and binders, if appropriate with the addition of fillers, in moulds to temperatures between 150° and 350° C. The moulds are preferably closed, gaspermeable moulds.

For carrying out the process according to the invention, expandable graphite materials can be used which were obtained by incorporation of expansive molecules into the interstitial lattice planes and are capable of expanding on heating to temperatures above, for example, 120° C. As such graphites, preferably those can be used into which, for example, $NO_x$, $SO_x$, halogens, $H_2O$ and/or strong acid have been incorporated. Mixtures of different types of expandable graphites can also be used.

According to a special embodiment of the process according to the invention, binders are used additionally. In this case, the expandable graphite materials can beforehand be mixed with a binder which, at the processing temperature, is fusible, softens, can decompose, in some cases with intermediate liquefaction, or is intumescent in some cases. As a result, the stability and, if appropriate, the intumescence of the mouldings obtained are increased. The binders used here can in principle be all binders which can be used, for example, for mineral materials, fibres, wood or natural materials. These can be reactive or unreactive binders, for example polymers, oligomers or monomers, as well as dispersions, solutions or pure substances of, for example, polyvinyl compounds, polyester resins, epoxide resins, formaldehyde resins, furan resins or coumaron resins (for example based on phenol, melamine, urea or dicyandiamide), isocyanate resins, cyanurate resins, polyurethanes, polyimide resins or cyanate resins.

Preferably, those binders or binder mixtures are used which, when exposed to a flame, burn only with very little smoke or not at all and which, at the preferred processing temperatures, melt, soften, melt or soften with intermediate decomposition or, in some cases, intumesce themselves.

The following may be mentioned as examples of such binders: hydrates of inorganic salts, for example hydrates of sulphates, phosphates, borates, gluconates, phosphonates, silicates, borosilicates, acetates, oxalates, tartrates and maleates of alkali metals or alkaline earth metals; and also phosphates, phosphonates and borates of ammonia or amines such as, for example, ethylenediamine and melamine. Carbohydrates such as the most diverse sugars or sugar-like substances such as, for example, pentaerythritol, molasses, sugar syrups, natural gums, sucrose or invert sugar, hydroxyethylcellulose or carboxymethylcellulose, dextrans, wood flour, straw flour, wheat flour, rice flour, soya flour and sewage sludge, may also be mentioned. Furthermore, peptides such as, for example, chicken proteins, milk proteins or abattoir proteins. Moreover tars, bitumen and distillation residues. Urea, condensation products thereof, dicyandiamide, hydrazodicarboxamide, cyanuric acid and derivatives thereof may also be mentioned.

Sugars, bitumen, melamine, dicyandiamide, urea, neutral ethylenediamine phosphate, ammonium phosphate, perlite, vermiculite, Ca sulphate hydrates, alkali metal silicate hydrates or borax are used with particular preference and, if appropriate, also mixtures of the abovementioned substances.

Ethylenediamine phosphate having a neutral reaction is very particularly preferred.

The abovementioned binders can be added to the expandable graphite materials in quantities of, for example, 0 to 80% by weight, preferably 5 to 50% by weight (relative to expandable graphite).

Mixtures of expandable graphites, if appropriate binders and usual fillers can also be used for carrying out the process according to the invention. Examples of fillers which can be used are chalk, asbestos, metal powders, metal oxides, metal hydroxides, silicates, carbon, powdered rock, glass, slags, filter dusts and ashes.

The fillers can be added in quantities of, for example, 0 to 1000% by weight, preferably 0 to 500% by weight (relative to expandable graphite).

In certain cases, for example in the production of boards, it can be of advantage to add reinforcing fibres to the mixture of expandable graphites and, if appropriate, binders. For example, fibres of the following materials are suitable for this purpose: glass, metal, cellulose, carbon, polyimide, polyaramide, asbestos, alumina or fused minerals (rock wool).

The fibres can be added, for example, in quantities from 0 to 750% by weight, preferably 0 to 500% by weight (relative to expandable graphite).

The filling of the moulds can be effected completely or partially by loose blowing-in or pouring-in of the preferably flocky or granulated graphite material. It can, however, also be introduced by pressing in at temperatures below 150° C., preferably at temperatures from 20° to 120° C.

The moulds can be protected by parting agents, which can, for example, be talc or graphite, if appropriate as an aqueous dispersion.

The filled moulds are heated according to the invention to temperatures between 150° and 350° C., preferably to 200° to 300° C. Although higher temperatures of up to, for example, 600° C. are possible, they give in most cases mouldings which intumesce less readily. The mouldings obtained can have densities of, for example, 200 to 900 kg/m$^3$, preferably 350 to 700 kg/m$^3$.

The mouldings according to the invention, which are obtained by heating expandable graphites in moulds to temperatures between 150° and 350° C., if desired in the presence of binders and if desired with addition of fillers and/or fibres, can, for example, be boards, building blocks, pipes, sections or half-shells.

The mouldings according to the invention can be produced by generally known methods. If boards are to be produced, it is possible, for example, to place a spacer frame, which has been sprinkled with talc and is made of steel, between the likewise talc-sprinkled plates of a heatable press and to fill it level with the expandable graphite material. This can also be an expandable graphite material which contains binder, filler and/or fibres. In addition, a carrier material, which is compact, for example a metal sheet, wood or ceramic, or a textile structure or a foam, can also be fitted between the plate press and the filling of the spacer frame on one side, on two sides or partially, so that a sandwich board is formed. This can be, for example, a glass mat, glass fabric, polyaramide fabric, metallic sheets or ceramic plates or carbon plates, mineral fibre boards, Ca silicate boards, laminate boards or cement slabs of the most diverse types.

If one or more covering layers are to be applied to the moulding according to the invention at the same time when it is produced, it is preferable to use a material which has the highest possible thermal conductivity.

After the supplementary manipulations which may have to be carried out, such as, for example, adjustment, insertion of displacement bodies, application of parting agent, have been carried out, the press is closed and, depending on the thickness of the moulding and the heating power of the press, heated for, for example, 5 minutes to 1.5 hours and longer to, for example, 240° C. Advantageously, the press is then cooled to temperatures below 150° C. and the moulding is removed from the press. This gives a stable board which, if desired, can be formed as a complete or partial sandwich and which vigorously intumesces on exposure to a flame.

More complicated mouldings can advantageously be produced in a metal mould which can be assembled from various parts without undercuts. This mould is sprinkled with talc and filled with the expandable graphite material. The press can then be closed to such an extent that there are still sufficient leaks, from which the expansion gases can escape. The press is then heated for, for example, 0.1 to 2 hours to, for example, 250° C. and cooled, and the finished moulding is removed. If the mould had been filled with pure expandable graphite material (flocky form), the density obtained is in most cases of the order of magnitude of 0.5 g/cm$^3$. The moulding is mechanically stable, can be worked and vigorously intumesces on exposure to a flame, that is to say the volume expands by, for example, more than 300%.

Such mouldings can also be produced by means of a so-called "lost" mould, for example if the metal mould of a pipe sleeve remains on the moulding at least on the outside, so that the sleeve filled with the expandable graphite material in a mechanically stable manner is protected by the sheet metal skin and can be used for (partially) sheathing pipes, so that the sleeve, because of its inward-directed intumescence (expansion), pinches off and seals the pipe where the sleeve is heated by the action of fire.

Grid-like or screen-like mouldings can also be produced which can be used, for example, in passage orifices for gases, which orifices seal by intumescence when they are heated correspondingly. By means of the mouldings according to the invention, devices can also be produced which, on heating, exert a mechanical pressure on other structural elements and thus actuate closures and/or activate switches and release or actuate barriers.

Surprisingly, in spite of the expansion of the graphite material being necessarily restricted by the largely closed nature of the moulds but nevertheless taking place, the expansion gases are only incompletely released, so that a further expansion of the graphite material on exposure to a flame occurs. Moreover, mouldings which are relatively stable dimensionally and, if appropriate, require only a little binder or organic auxiliaries or none at all, are thus produced in the moulds. These can be used, for example, as intumescent mouldings or building and construction elements for purposes of preventive fire protection or for other purposes where, for example, foam-like graphite mouldings having densities of less than 1000 kg/m$^3$ and, if appropriate, intumescence and/or a certain conductivity for electricity or heat are required.

EXAMPLES

In the examples which follow, the percentages and parts indicated relate to the weight, unless otherwise stated.

The following were used in the examples below:
Expandable graphite A.

This is a flocky commercial product of the SO$_x$ type having an expansion of more than 500% by volume (without backpressure) at 600° C.

Expandable graphite B.

This is a flocky commercial product of the NO$_x$ type having an expansion of more than 500% by volume (without backpressure) at 600° C.

The mould used was a 2 cm high steel frame, which could be taken apart, had an internal dimension of 10×10 cm and was screwed on both sides to two plane steel plates. This assembly was filled level with the expandable graphite mixture or with the expandable graphite and placed into an oven preheated to the particular reaction temperature and left therein for 1.5 hours. The mould was then cooled to room temperature and the moulding was taken out of the mould. The parting agent used was talc or release paper.

EXAMPLE 1

Because of active pressing in this comparative experiment, the steel frame in the mould was replaced by a frame of sponge rubber. The mould was then filled with expandable graphite B, pressed for one minute at 30 bar, then made up again and then pressed for 15 minutes at room temperature under 75 bar. The press cake thus obtained disintegrated on removal from the mould, it did not have any mechanical stability. The mould was then provided with the steel frame and filled with expandable graphite B and, after closing, heat-treated at 100° C. The experiment was repeated with other, similar fillings at 150, 200, 250, 300, 350, 400, 600° C. On removal from the mould, it was found that the moulding can be removed from the mould without disintegration only at 150° C. and higher temperatures. Boards having good stability were obtained from 200° to 600° C. On exposure to a flame, it was found that the intumescence of the board decreased markedly at a reaction temperature of about 400° C. and higher. Building blocks were cut from the boards and transferred into an oven preheated to 700° C. After 15 minutes (measured as a loose heap), the expansion of the graphite material was more than 500% by volume at 100° to 350° C. reaction temperature, about 450% by volume at 400° C. reaction temperature and less than 15% by volume at 600° C.

Expandable graphite A was then used in place of expandable graphite B, analogous results being obtained. The experiments showed, surprisingly, that stable and intumescent mouldings can be obtained when expandable graphite is heated in closed moulds to temperatures between 150° and 350° C.

EXAMPLE 2

Mixtures of 15% of binder and 85% of expandable graphite A were prepared. The following binders were used in powder form:
a: sucrose
b: hard bitumen, air-blown
c: melamine
d: dicyandiamide
e: urea
f: ethylenediamine phosphate, neutral
g: mixture of 50% of pentaerythritol and 50% of secondary ammonium phosphate Mixtures were also prepared from 70% of expandable graphite B and 30% of binder:
h: granulated perlite
i: granulated vermiculite
k: calcium sulphate dihydrate
l spray-dried sodium waterglass powder, basic (Messrs. Henkel)
m: borax
n: soda, sodium bicarbonate, chalk (1:1:1 ratio)

The mixtures a to n were introduced into the steel mould and heat-treated for 1.5 hours at 250° C. After cooling, the products were removed from the mould. Mechanically stable mouldings were obtained in all cases. The boards of 2 cm thickness had a density of between 450 and about 650 kg/m$^3$. The expansion at 750° C. after 15 minutes was more than 500% by volume in all cases.

EXAMPLE 3

70 g, 100 g and 130 g of expandable graphite B were introduced into the board mould. After heat treatment at 260° C., stable boards having densities of about 0.35, 0.48 and 0.64 g/cm$^3$ were obtained, which vigorously intumesced on exposure to a flame.

EXAMPLE 4

100 g of a mixture of ethylenediamine phosphate (neutral) and 95, 90, 85, 70 or 50% of expandable graphite B were introduced into the board mould and caused to react at 250° C. After cooling, stable boards having densities of around 0.5 g/cm$^3$ were obtained, which vigorously intumesced on exposure to a flame.

For comparing the foaming behaviour of a building block, which was produced from the mixture containing 85% of expandable graphite, with that of a building block produced at the same temperature from expandable graphite without addition of the binder, both building blocks were transferred into an oven preheated to 300° C. It was found that the binder-containing building block intumesced about 50% more than the binder-free building block. This effect is surprising.

EXAMPLE 5

In a mixer, a mixture of 30 parts of short glass fibres and 70 parts of expandable graphite A as well as 30 parts of ethylenediamine phosphate was prepared. The board mould was filled with 110 parts of the mixture and heated for 1 hour at 300° C. This gave a mechanically very stable board of a density of about 510 kg/m$^3$, which still vigorously intumesced on exposure to a flame. Improved cohesion of the expanding graphite particles resulted from the fibre reinforcement.

EXAMPLE 6

In the board mould, a glass fibre fabric in plain weave (650 g/m$^2$) was introduced between the two cover plates and the spacer frame filled with a mixture of 15% of ethylenediamine phosphate and 85% of expandable graphite B. The system was then heated for 100 minutes at 260° C. After cooling, a stable sandwich board was obtained which excellently intumesced on exposure to a flame.

EXAMPLE 7

Two talc-sprinkled steel pipes were centered in one another with their axes parallel, so that the interspace formed a tube of about 2.5 cm wall thickness. The steel walls of this tubular space were each lined with 4 plies of newsprint. The space was then filled with a mixture of 15% of sodium silicate powder (basic) and 85% of expandable graphite A and provided with a small steel plate as cover. This was heated for 1.5 hours to 250° C. After cooling, the product was removed from this mould. A stable pipe of graphite material was obtained, which can be used as a pipe sleeve. On exposure to a flame, vigorous intumescence took place.

EXAMPLE 8

In the mould indicated, a board of 2 cm thickness (density about 500 kg/m$^3$) was produced at 250° C. using a mixture of 80 parts of expandable graphite A and 20 parts of ethylenediamine phosphate. This board was provided with 50 bores of 4 mm diameter. The board was then introduced between two stainless steel screens of about 3 mm mesh width and installed flush in a square chimney stack (10×10 cm). A stream of hot air was then blown through this chimney stack, whose temperature was increased up to 800° C. When the gas temperature had reached 500° C., the installed screen board of the graphite material started to close due to the expansion taking place. At 650° C., the chimney stack was sealingly isolated against further passage of the heating gas. This experiment simulated the possibility of installing fire protection seals into air-conditioning ducts, vertical or horizontal cable ducts or ventilation ducts, using the mouldings according to the invention.

What is claimed is:

1. An intumescent moulding composition comprising partially expanded graphite which is obtained by heating expandable graphite in a mould to a temperature between 150° C. and 350° C.

2. A process for producing an expanded graphite moulded article, by heating a mixture of an expandable graphite composition in combination with a binder, comprising ethylene diamine phosphate, to a temperature between 150° C. and 350° C. in a mould wherein the expandable graphite used contains $NO_x$ and/or $SO_x$ as expanding agent.

3. A process of claim 2, in which mixtures of the expandable graphite, in combination with a binder and a filler are heated to form the moulded article.

4. A method of preventive fire protection, in which a moulding made from the moulding composition of claim 1 is a building component.

* * * * *